United States Patent
Kimura (10) Patent No.: US 8,404,386 B2
(45) Date of Patent: Mar. 26, 2013

(54) METHOD OF MANUFACTURING LITHIUM SECONDARY BATTERY AND LITHIUM SECONDARY BATTERY

(75) Inventor: Kenji Kimura, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1309 days.

(21) Appl. No.: 12/087,059

(22) PCT Filed: Nov. 1, 2007

(86) PCT No.: PCT/JP2007/071307
§ 371 (c)(1), (2), (4) Date: Jun. 25, 2008

(87) PCT Pub. No.: WO2008/059717
PCT Pub. Date: May 22, 2008

(65) Prior Publication Data
US 2009/0011338 A1    Jan. 8, 2009

(30) Foreign Application Priority Data
Nov. 15, 2006  (JP) ................. 2006-309140

(51) Int. Cl.
H01M 10/24 (2006.01)
H01M 10/00 (2006.01)
H01M 4/24 (2006.01)
H01M 6/18 (2006.01)

(52) U.S. Cl. ............... 429/231.95; 429/304; 429/322

(58) Field of Classification Search ............ None
See application file for complete search history.

(56) References Cited

U.S. PATENT DOCUMENTS

| | | | |
|---|---|---|---|
| 5,494,762 A | 2/1996 | Isoyama et al. | |
| 6,365,300 B1 | 4/2002 | Ota et al. | |
| 6,887,623 B2 | 5/2005 | Fujimoto et al. | |
| 2010/0151335 A1* | 6/2010 | Senga et al. | 429/322 |

FOREIGN PATENT DOCUMENTS

| | | |
|---|---|---|
| DE | 694 07 843 T2 | 5/1998 |
| DE | 60 2005 001 023 T2 | 1/2008 |
| EP | 0 615 299 A1 | 9/1994 |
| EP | 1 598 896 A1 | 11/2005 |
| JP | 53126/1993 | 7/1993 |

(Continued)

OTHER PUBLICATIONS

Office Action issued Jul. 14, 2011 in DE 11 2007 002 732.0 and English translation thereof.

Primary Examiner — Barbara Gilliam
Assistant Examiner — Angela Martin
(74) Attorney, Agent, or Firm — Kenyon & Kenyon LLP (57) ABSTRACT

The invention provides a method of readily manufacturing a lithium secondary battery including a solid electrolyte layer having space for accommodating deposited lithium. A lithium secondary battery includes a positive electrode element, a negative electrode element and a solid electrolyte layer placed between them. A method of manufacturing the battery includes a first step of stacking at least a first group of particles and a second group of particles to form the solid electrolyte layer, the second group of particles having an average particle diameter larger than that of the first group of particles, and a second step of stacking the positive and negative electrode elements on the solid electrolyte layer such that the negative electrode element is in contact with a surface of the second group of particles in the solid electrolyte layer.

2 Claims, 5 Drawing Sheets

FOREIGN PATENT DOCUMENTS

| | | |
|---|---|---|
| JP | 06-084512 | 3/1994 |
| JP | 10-012279 | 1/1998 |
| JP | 2000-228185 A | 8/2000 |
| JP | 2000-340257 A | 12/2000 |
| JP | 2001-110447 A1 | 4/2001 |
| JP | 2002-313319 | 10/2002 |
| WO | 98/37589 A1 | 8/1998 |
| WO | WO 98/37589 * | 8/1998 |

* cited by examiner

METHOD OF MANUFACTURING LITHIUM SECONDARY BATTERY AND LITHIUM SECONDARY BATTERY

This is a national phase application of PCT/JP2007/071307 filed 1 Nov. 2007, claiming priority to Japanese Patent Application No. 2006-309140 filed 15 Nov. 2006, the contents of which are incorporated herein by reference.

TECHNICAL FIELD

The present invention relates to a lithium secondary battery including a solid electrolyte layer containing spaces which can accommodate deposited lithium between a positive electrode and a negative electrode, and to a method of manufacturing the lithium secondary battery.

BACKGROUND ART

Lithium secondary batteries have conventionally been used for various applications such as a power source of an electronic device and a battery mounted on a vehicle. The lithium secondary battery may experience a minute internal short circuit due to repeated charge and discharge. This may result in a reduced capacity of the secondary battery to shorten the battery life.

It is contemplated that one of the causes of the internal short circuit is volume expansion of lithium in a negative electrode because of atomization of lithium due to repeated charge and discharge. Specifically, the volume of lithium deposited at the negative electrode may be expanded to press and thin a separator, or lithium seeking space for deposition may be deposited into fine pores in the separator to reach a positive electrode. This may cause electrical contact between the positive electrode and the negative electrode to lead to the internal short circuit.

To suppress the volume expansion of lithium due to the deposition, the techniques described below have been proposed.

Patent Document 1 describes a lithium secondary battery in which a spacer is placed between an electrode (a positive electrode or a negative electrode) and a separator to reserve a space for accommodating deposited lithium. In the lithium secondary battery described in Patent Document 1, the separator is formed of a stack of a plurality of nonwoven fabrics having different void rates such that the void rate near the negative electrode is higher than that near the positive electrode.

Each of Patent Documents 2 and 3 describes a lithium secondary battery in which a collector for a negative electrode has a bumpy surface opposed to a separator to provide a space for accommodating deposited lithium.

[Patent Document 1] Japanese Patent Publication No. 10 (1998)-12279 (Paragraph [0015] to [0017], [0032], [0034], FIGS. 13, 14 and the like)

[Patent Document 2] Japanese Patent Publication No. 2000-228185 (Paragraph [0011] and the like)

[Patent Document 3] Japanese Patent Publication No. 2002-313319 (Paragraph [0009], [0010] and the like)

[Patent Document 4] Japanese Patent Publication No. 06 (1994)-84512

DISCLOSURE OF THE INVENTION

Problems to be Solved by the Invention

In the abovementioned lithium secondary batteries, however, the following problems arise.

In the secondary battery of the configuration including the spacer placed between the electrode and the separator, it is necessary to provide the spacer in addition to the electrode and the separator which are common components of the secondary battery, thereby increasing the cost of the secondary battery. Also, the process of manufacturing the secondary battery requires the extra step for positioning the spacer.

On the other hand, when the plurality of nonwoven fabrics are stacked to provide the separator having different void rates in the stacking direction (thickness direction), it is necessary to prepare the plurality of nonwoven fabrics having different void rates, which increases the cost of the secondary battery. In addition, stacking the plurality of nonwoven fabrics inevitably complicates the process of manufacturing the separator.

In the secondary battery of the configuration including the collector for the negative electrode having the bumpy surface, the bumpy surface may be crushed flat in the process of manufacturing the secondary battery to make it impossible to reserve the space for accommodating deposited lithium. In typical manufacturing of the secondary battery, a negative electrode, a separator, and a positive electrode are stacked in this order and then the stack is pressed in the stacking direction. The bumpy surface of the collector for the negative electrode may be crushed flat during the pressing.

Especially when the negative electrode is made of lithium or indium, for example, these metals are relatively soft and the bumpy surface may be easily crushed.

It is an object of the present invention to provide a method of manufacturing a lithium secondary battery in which spaces can be reserved readily for accommodating deposited lithium between a positive electrode and a negative electrode.

Means for Solving Problems

According to a first aspect, the present invention provides a method of manufacturing a lithium secondary battery including a positive electrode element, a negative electrode element and a solid electrolyte layer placed between the positive and negative electrode elements. The method includes a first step of stacking at least a first group of particles and a second group of particles to form the solid electrolyte layer, the second group of particles having an average particle diameter larger than the average particle diameter of the first group of particles, and a second step of stacking the positive electrode element and the negative electrode element on the solid electrolyte layer such that the negative electrode element is in contact with a surface of a portion of the solid electrolyte layer, the portion including the second group of particles.

The first step may include a step of forming a first layer using the first group of particles, a step of forming a second layer using the second group of particles, and a step of stacking the first layer and the second layer to form the solid electrolyte layer.

According to a second aspect, the present invention provides a method of manufacturing a lithium secondary battery including a positive electrode element, a negative electrode element and a solid electrolyte layer placed between the positive and negative electrode elements. The method includes a step of forming a bumpy surface on one of end faces of the solid electrolyte layer, and a step of stacking the positive electrode element and the negative electrode element on the solid electrolyte layer such that the negative electrode element is in contact with the bumpy surface of the solid electrolyte layer.

A first group of particles and a second group of particles having an average particle diameter larger than the average particle diameter of the first group of particles maybe stacked to form the solid electrolyte layer.

According to a third aspect, the present invention provides a lithium secondary battery including a positive electrode element and a negative electrode element, and a solid electrolyte layer placed between the positive electrode element and the negative electrode element, wherein the solid electrolyte layer has a first layer including a first group of particles and a second layer which includes a second group of particles having an average particle diameter larger than the average particle diameter of the first group of particles and is in contact with the negative electrode element.

According to a fourth aspect, the present invention provides a lithium secondary battery including a positive electrode element and a negative electrode element, and a solid electrolyte layer placed between the positive electrode element and the negative electrode element, wherein the solid electrolyte layer has a bumpy surface in contact with the negative electrode element.

The negative electrode element may be formed of a collector for a negative electrode contacting the solid electrolyte layer. The negative electrode element may include lithium or an alloy of lithium.

The solid electrolyte layer may be formed of a polymer solid electrolyte or an inorganic solid electrolyte. When a sulfide is used as the particles (at least one of the first and second groups of particles) forming the solid electrolyte layer, the conductivity of lithium ion can be improved. Examples of the sulfide can include lithium sulfide and silicon sulfide.

EFFECTS OF THE INVENTION

According to the method of manufacturing a lithium secondary battery of the first aspect of the present invention, the solid electrolyte layer can be formed only by stacking the first and second groups of particles to prevent complication of the manufacturing process of the lithium secondary battery. In addition, the second group of particles having the larger average particle diameter than that of the first group of particles is used in the portion of the solid electrolyte layer in contact with the negative electrode element, so that the space provided in the second group of particles can be used to accommodate deposited lithium.

According to the method of manufacturing a lithium secondary battery of the second aspect of the present invention, the solid electrolyte layer has the bumpy surface in contact with the negative electrode element, so that crushing of the bumpy surface during manufacturing of the lithium secondary battery can be prevented as compared with the bumpy surface formed on the negative electrode element. This can reserve the space for accommodating lithium deposited on the negative electrode element.

BEST MODE FOR CARRYING OUT THE INVENTION

Preferred embodiments of the present invention will hereinafter be described.

[Embodiment 1]

A lithium secondary battery which is Embodiment 1 of the present invention will hereinafter be described with reference to FIG. 1.

Figure 1:
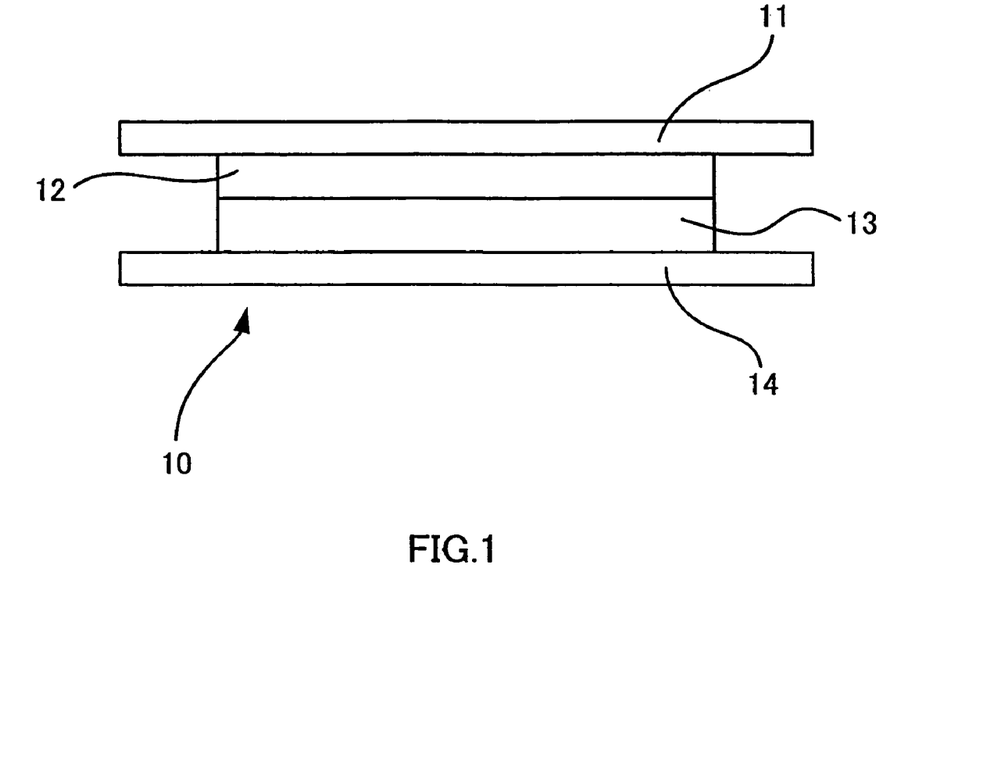
FIG. 1 A schematic diagram showing the configuration of a lithium secondary battery which is Embodiment 1 of the present invention.

In FIG. 1, a positive electrode layer 12 is formed on a surface of a collector 11 for a positive electrode. The collector 11 and the positive electrode layer 12 constitute a positive electrode element. The positive electrode layer 12 includes an active material. The positive electrode layer 12 may also include a conductive additive, a binder, an additive, and electrolyte for increasing ionic conduction such as an inorganic solid electrolyte, a polymer gel electrolyte, and a polyelectrolyte, as required. The collector 11 can be formed of, for example, aluminum foil.

The active material for the positive electrode may be made of a lithium transition metal composite oxide, for example. Specifically, it is possible to use a Li—Co composite oxide such as $LiCoO_2$, a Li—Ni composite oxide such as $LiNiO_2$, a Li—Mn composite oxide such as spinel $LiMn_2O_4$, and a Li—Fe composite oxide such as $LiFeO_2$.

A solid electrolyte layer 13 is placed between the positive electrode layer 12 and a collector 14 for a negative electrode. A lithium secondary battery 10 of Embodiment 1 has no negative electrode layer including an active material on a surface of the collector 14 opposed to the solid electrolyte layer 13. The omission of the negative electrode layer can reduce the cost of the lithium secondary battery 10.

The collector 14 can be formed of copper foil, for example. Lithium or an alloy of lithium may be provided on the surface of the collector 14 formed of copper foil.

The solid electrolyte layer 13 can be made of an inorganic solid electrolyte or a polymer solid electrolyte. For example, a nitride of Li, a halide, oxysalt, and a phosphorus sulfide compound can be used as the inorganic solid electrolyte. More specifically, $Li_3N$, $LiI$, $Li_3N$—$LiI$—$LiOH$, $LiSiO_4$, $LiSiO_4$—$LiI$—$LiOH$, $Li_3PO_4$—$Li_4SiO_4$, and $Li_2SiS_3$ can be used.

As the polymer solid electrolyte, it is possible to use a material made of the electrolyte as described above and a polymer for dissociation of the electrolyte, or a material including a polymer having an dissociable group, for example. Examples of the polymer for dissociation of the electrolyte can include a polyethylene oxide derivative, a polymer containing the derivative, a polypropylene oxide derivative, a polymer containing the derivative, and a phosphate polymer. The inorganic solid electrolyte and the polymer solid electrolyte may be used in combination.

When a sulfide is used as the material forming the solid electrolyte layer 13, the conductivity of lithium ion can be improved. Examples of the sulfide can include lithium sulfide and silicon sulfide.

Figure 2:
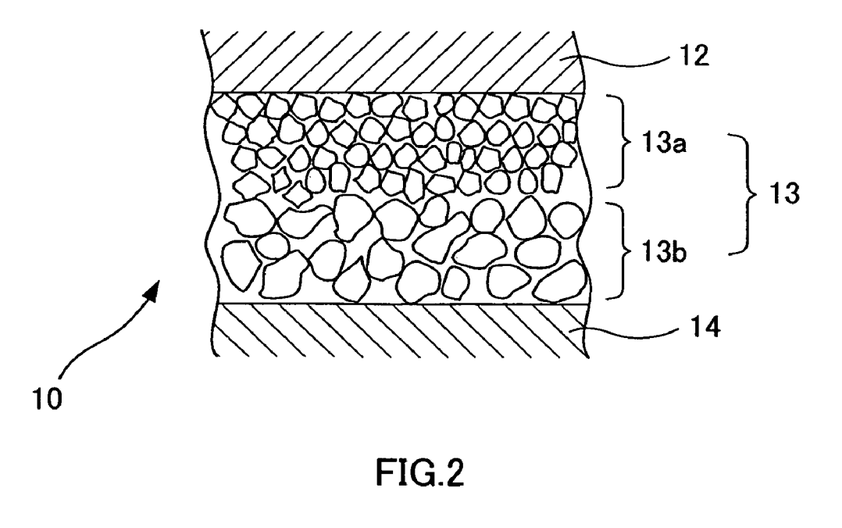
FIG. 2 A schematic diagram showing the configuration of a solid electrolyte layer in Embodiment 1.

The solid electrolyte layer 13 contains groups of particles (a plurality of types of particles) having different average particle diameters. FIG. 2 shows a side view (enlarged view) showing the detailed configuration of the solid electrolyte layer 13.

As shown in FIG. 2, the solid electrolyte layer 13 has a first layer 13a and a second layer 13b. The first layer 13a and the second layer 13b are made of a plurality of particles (group of particles) such that the group of particles forming the second layer 13b have an average particle diameter larger than that of the group of particles forming the first layer 13a.

Figure 3:
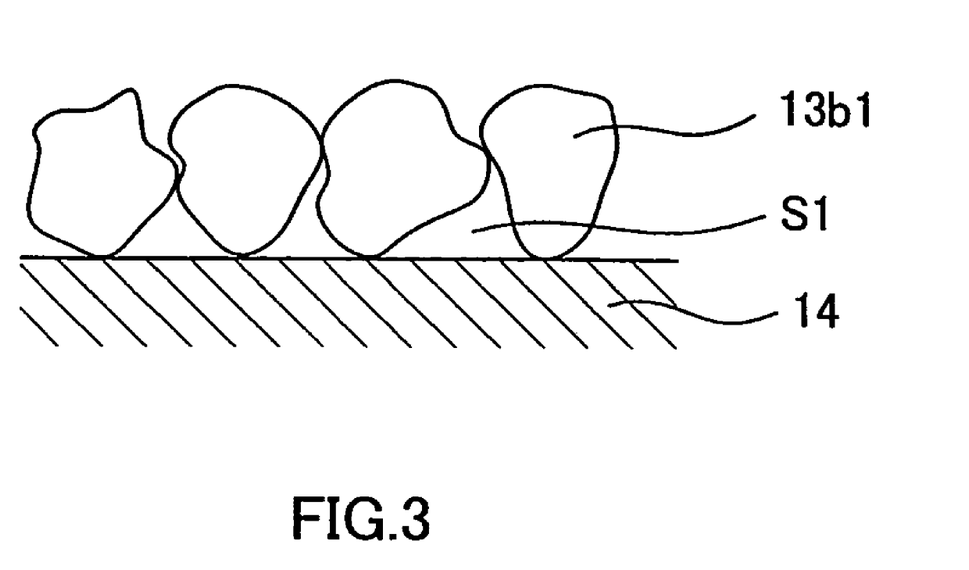
FIG. 3 An enlarged view showing the contact portions of the solid electrolyte layer and a collector in Embodiment 1.

The second layer 13b is in contact with the collector 14 and the first layer 13a is in contact with the positive electrode layer 12. In other words, of the plurality of types of particles contained in the solid electrolyte layer 13, the particles of the type having the larger diameter are in contact with the collector 14. As shown in FIG. 3, when a particle 13b1 having the larger diameter is in contact with the collector 14, a space S1 is present between the surface of the particle 13b1 and the surface of the collector 14.

Since the average particle diameter of the particles forming the second layer 13b is larger than that of the particles forming the first layer 13a, the space between the particles in the second layer 13b is larger than that between the particles in the first layer 13a. In other words, the space S1 (see FIG. 3) present on the surface of the collector 14 is larger than the space present in the first layer 13a of the solid electrolyte layer 13.

In charge of the lithium secondary battery 10 of Embodiment 1, lithium ions contained in the positive electrode layer 12 are moved toward the collector 14 through the solid electrolyte layer 13 and lithium is deposited on the surface of the collector 14. Specifically, lithium starts to be deposited at the contact portion between the particle 13b1 and the collector 14 in FIG. 3. On the other hand, in discharge of the lithium secondary battery 10, lithium deposited on the collector 14 is changed into lithium ions which are then moved toward the positive electrode layer 12 through the solid electrolyte layer 13.

The space S1 (see FIG. 3) present on the surface of the collector 14 as described above can be used to accommodate lithium deposited on the surface of the collector 14 during the charge. The previously provided space S1 for accommodating deposited lithium can suppress deformation of the solid electrolyte layer 13 or the collector 14 when lithium is deposited on the surface of the collector 14, thereby preventing volume expansion of the lithium secondary battery 10.

Especially in the configuration of the lithium secondary battery 10 of Embodiment 1 in which the collector 14 is in direct contact with one of end faces of the solid electrolyte layer 13, lithium is deposited on the collector 14 to readily cause volume expansion of the lithium secondary battery 10. However, the lithium secondary battery 10 of Embodiment 1 can be used to prevent the volume expansion with high efficiency.

For example, when the lithium secondary battery 10 of Embodiment 1 is mounted on a vehicle, it is necessary to stack a plurality of lithium secondary batteries 10 and hold the stack on both ends with a holding mechanism (not shown). The holding mechanism is used for preventing the volume expansion of the stacked lithium secondary batteries 10. The structure of the holding mechanism can be simplified by preventing the volume expansion of the lithium secondary batteries 10 according to Embodiment 1.

On the other hand, if the solid electrolyte layer 13 is made only of the group of particles forming the second layer 13b, the contact area between the particles is reduced to limit the moving paths of lithium ions. In other words, charge and discharge of the lithium secondary battery 10 cannot be performed efficiently.

To address this, the solid electrolyte layer 13 of Embodiment 1 includes not only the second layer 13b but also the first layer 13a made of the group of particles having the smaller average particle diameter than that of the group of particles forming the second layer 13b. The use of the group of particles having the smaller average particle diameter can increase the contact area between the particles to reserve the sufficient moving paths of lithium ions. This can improve the efficiency of charge and discharge.

In this manner, in the lithium secondary battery 10 of Embodiment 1, lithium deposited on the collector 14 during charge can be accommodated by the previously provided space S1 while the sufficient moving paths of lithium ion are reserved.

The thicknesses of the first layer 13a and the second layer 13b (lengths in a vertical direction of FIG. 2) can be set as appropriate. However, an extremely large thickness of the second layer 13b makes it difficult to provide the sufficient moving paths of lithium ions as described above. The space S1 present on the collector 14 needs to have the size for accommodating lithium deposited on the collector 14. In view of those requirements, the thicknesses of the first layer 13a and the second layer 13b may be set.

While the solid electrolyte layer 13 includes the two layers 13a and 13b in Embodiment 1, the present invention is not limited thereto. The solid electrolyte layer 13 may be formed of three or more layers. In this case, the solid electrolyte layer 13 may be formed of a plurality of layers such that the layer placed closest to the collector 14 contains a group of particles having an average particle diameter larger than those of groups of particles forming the other layers.

When the solid electrolyte layer 13 is formed of three or more layers, the average particle diameters of the groups of particles forming the respective layers may be reduced stepwise from the collector 14 to the positive electrode layer 12.

While the solid electrolyte layer 13 is formed of the two layers 13a and 13b with the boundary marked between them in Embodiment 1, the present invention is not limited thereto. Specifically, the groups of particles may be placed such that the average particle diameter is changed continuously in the thickness direction of the solid electrolyte layer 13 (vertical direction in FIG. 2). In this case, the group of particles in contact with the collector 14 needs to have an average particle diameter larger than those of the groups of particles in the other portions.

Figure 4:
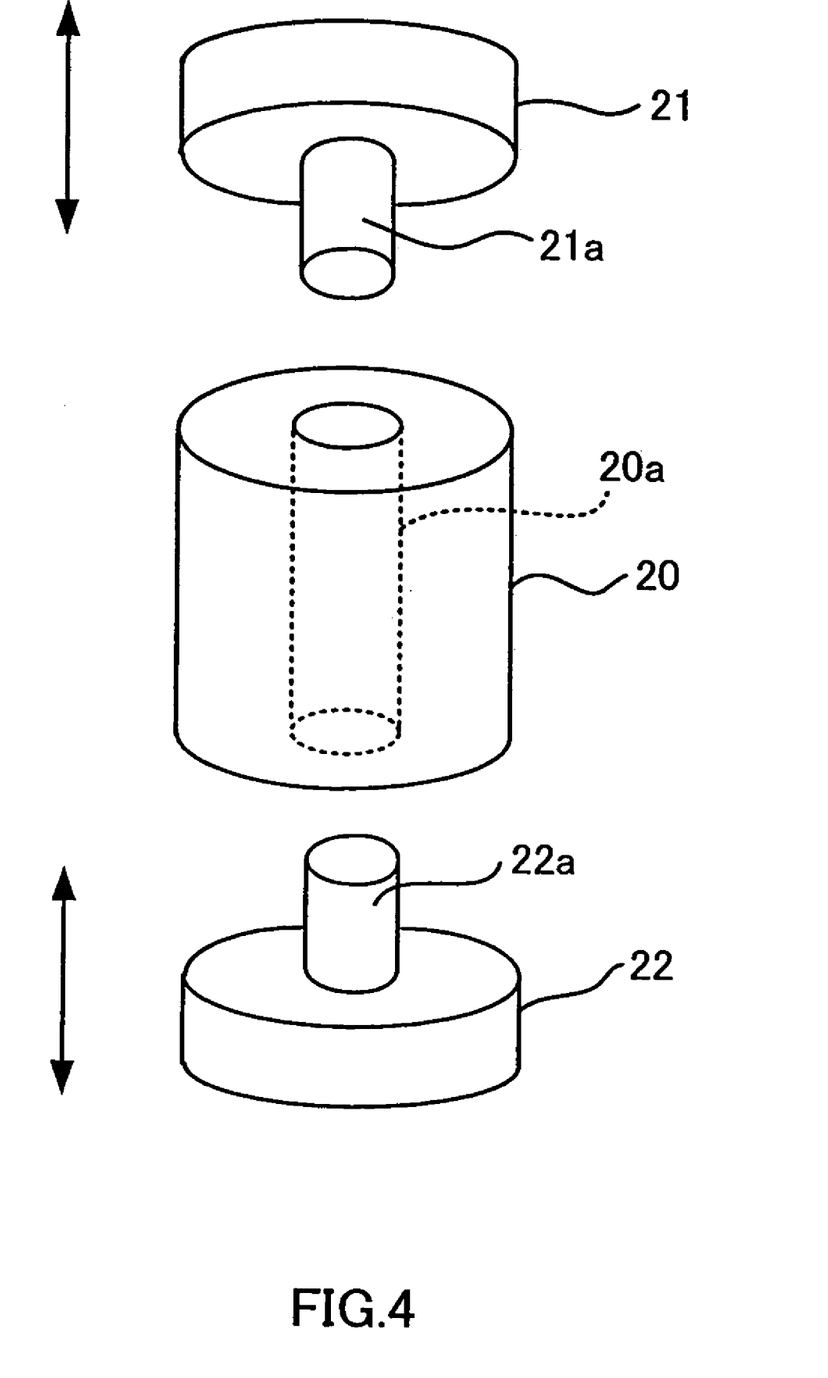
FIG. 4 A schematic diagram showing a press apparatus for use in forming the solid electrolyte layer in Embodiment 1.

Next, a method of manufacturing the lithium secondary battery 10 of Embodiment 1 will be described. The method of manufacturing the solid electrolyte layer 13 will be described particularly with reference to FIGS. 4 and 5. FIG. 4 shows a press apparatus for use in manufacturing the solid electrolyte layer 13.

In FIG. 4, the groups of particles forming the solid electrolyte layer 13 are to be put in a housing 20. Press members 21 and 22 are placed at both ends of the housing 20. The press members 21 and 22 are movable in directions indicated by arrows in FIG. 4.

First, a protrusion 22a of the press member 22 is inserted into a hole 20a of the housing 20. Then, the group of particles forming the second layer 13b of the solid electrolyte layer 13 is supplied into the hole 20a of the housing 20. A binder may be supplied into the hole 20a together with the group of particles to facilitate bonding between the particles.

Next, the group of particles forming the first layer 13a of the solid electrolyte layer 13 is supplied into the hole 20a of the housing 20. It is also possible to supply a binder into the hole 20a together with the group of particles to facilitate bonding between the particles.

Figure 5:
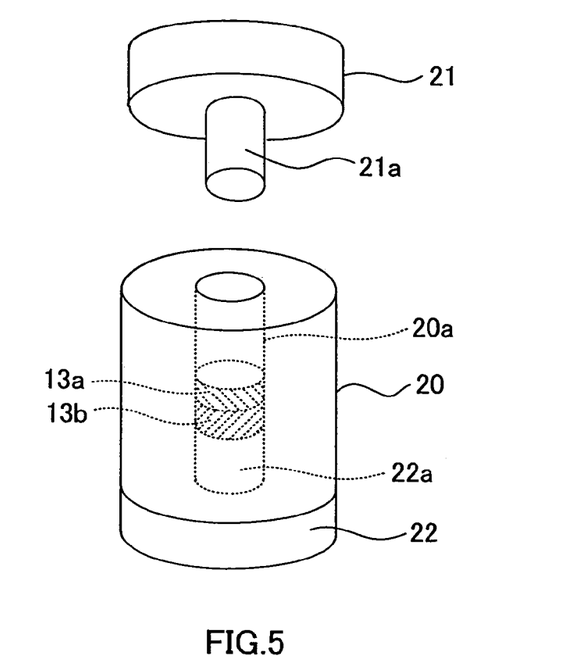
FIG. 5 A schematic diagram showing part of a process of forming the solid electrolyte layer in Embodiment 1.

As a result, the group of particles forming the first layer 13a and the second layer 13b are stacked in the hole 20a as shown in FIG. 5.

The groups of particles used for forming the solid electrolyte layer 13 can be prepared previously through screening or the like. Then, the group of particles having the larger average particle diameter can be used for forming the second layer 13b, while the group of particles having the smaller average particle diameter can be used for forming the first layer 13a.

Next, the press member 21 is moved downward from the position shown in FIG. 5 to insert a protrusion 21a of the press member 21 into the hole 20a of the housing 20. This causes the two groups of particles put in the hole 20a to be press-formed with the press members 21 and 22 to provide the solid electrolyte layer 13.

After the press forming, the protrusions 21a and 22a of the press members 21 and 22 are retracted from the hole 20a to allow the solid electrolyte layer 13 to be taken out from the hole 20a.

After the formation of the solid electrolyte layer 13, the previously formed positive electrode element (the collector 11 and the positive electrode layer 12) and negative electrode element (the collector 14) are placed on both end faces of the solid electrolyte layer 13 such that the collector 14 is in contact with the second layer 13b of the solid electrolyte layer 13. In this manner, the lithium secondary battery 10 of Embodiment 1 is formed.

While the group of particles forming the second layer 13b and the group of particles forming the first layer 13a are supplied in this order into the hole 20a of the housing 20 in the above description, the present invention is not limited thereto. The groups of particles may be supplied into the hole 20a in the reverse order.

The press forming may be performed each time the group of particles having a different average particle diameter is supplied into the hole 20a. In addition, the first layer 13a and the second layer 13b may be formed through press forming and then stacked.

The groups of particles forming the first layer 13a and the second layer 13b may be supplied into the hole 20a of the housing 20 and then the materials (including the active material) forming the positive electrode layer 12 may be supplied into the hole 20a, followed by press forming. In this case, the positive electrode layer 12 is formed integrally with one end face of the solid electrolyte layer 13. Then, the collector 11 is placed or put on the positive electrode layer 12 and the collector 14 is placed or put on the second layer 13b of the solid electrolyte layer 13 to provide the lithium secondary battery 10 of Embodiment 1.

If the solid electrolyte layer 13 is made of three or more layers, the groups of particles corresponding to the layers and having different average particle diameters may be prepared and stacked in the hole 20a of the housing 20. In this case, the plurality of groups of particles may be stacked such that the group of particles having the largest average particle diameter is placed at one end in the hole 20a.

To provide the solid electrolyte layer 13 including groups of particles having the average particle diameter continuously changed in the thickness direction, it is possible to supply groups of particles having different average particle diameters into the hole 20a of the housing 20 such that the mixing ratio of the particles varies in the solid electrolyte layer 13. In this case, the group of particles placed at one end face of the solid electrolyte layer 13 (on the surface thereof in contact with the collector 14) may have a larger average particle diameter than those of the groups of particles at the other positions.

According to the method of manufacturing the lithium secondary battery 10 of Embodiment 1, the space for accommodating lithium deposited during charge can be easily provided in the solid electrolyte layer 13 only by using the groups of particles having different average particle diameters. The method in Embodiment 1 can reduce the cost as compared with the lithium secondary batteries described in Patent Documents 1 to 3 since it is essential only that the groups of particles having different average particle diameters should be used for forming the solid electrolyte layer 13.

Since the method only requires the supply of the groups of particles having different average particle diameters in turn into the hole 20a of the housing 20, the conventional method of manufacturing the lithium secondary battery can be used to avoid complication of the manufacturing process of the lithium secondary battery 10.

[Embodiment 2]

Next, a lithium secondary battery which is Embodiment 2 of the present invention will be described. First, the configuration of the lithium secondary battery of Embodiment 2 will be described with reference to FIG. 6.

Figure 6:
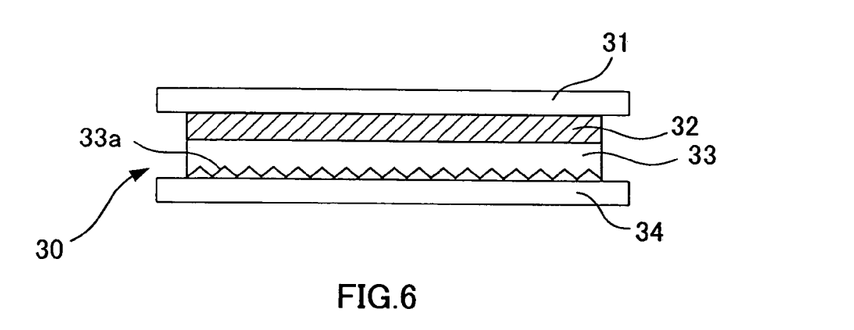
FIG. 6 A schematic diagram showing the configuration of a lithium secondary battery which is Embodiment 2 of the present invention.

In FIG. 6, a positive electrode layer 32 is formed on a surface of a collector 31 for a positive electrode. The positive electrode layer 32 includes an active material. The positive electrode layer may also include a conductive additive, a binder, an additive, and electrolyte for increasing ionic conduction such as an inorganic solid electrolyte, a polymer gel electrolyte and a polyelectrolyte, as required. The materials described in Embodiment 1 can be used as the active material for the positive electrode.

A solid electrolyte layer 33 is placed between the positive electrode layer 32 and a collector 34 for a negative electrode. Similarly to the battery of Embodiment 1, a lithium secondary battery 30 of Embodiment 2 has no negative electrode layer including an active material on a surface of the collector 34 opposed to the solid electrolyte layer 33. The omission of the negative electrode layer can reduce the cost of the lithium secondary battery 30.

The collectors 31 and 34 can be formed of aluminum foil or copper foil, similarly to Embodiment 1. Lithium or an alloy of lithium may be provided on the surface of the collector 34 formed of copper foil.

The solid electrolyte layer 33 can be made of a polymer solid electrolyte or an inorganic solid electrolyte. The materials described in Embodiment 1 can be used as specific materials of the solid electrolyte layer 33. The solid electrolyte layer 33 has a bumpy surface 33a closer to the collector 34.

Figure 7:
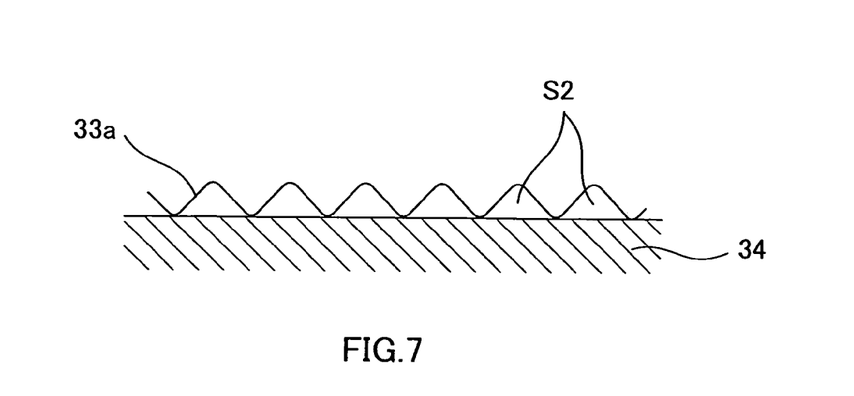
FIG. 7 An enlarged view showing the contact portions of a solid electrolyte layer and a collector in Embodiment 2.

The bumpy surface 33a formed on the solid electrolyte layer 33 provides a space S2 between the bumpy surface 33a and the collector 34 as shown in FIG. 7. FIG. 7 is an enlarged view showing the contact portion between the solid electrolyte layer 33 and the collector 34.

In Embodiment 2, lithium is deposited on the surface of the collector 34 during charge in the lithium secondary battery 30 as in Embodiment 1. Specifically, lithium is deposited at the contact portion between the bumpy surface 33a and the collector 34.

In Embodiment 2, the space S2 is present between the solid electrolyte layer 33 and the collector 34 as described above, so that deposited lithium is accommodated by the space S2.

The space S2 for accommodating lithium in this manner can suppress deformation of the solid electrolyte layer 33 or the collector 34 when lithium is deposited on the surface of the collector 34, thereby preventing volume expansion of the lithium secondary battery 30.

Especially in the configuration of the lithium secondary battery 30 of Embodiment 2 in which the collector 34 is in direct contact with the bumpy surface 33a of the solid electrolyte layer 33, lithium deposited on the collector 34 readily causes volume expansion of the lithium secondary battery 30. However, the lithium secondary battery 30 of Embodiment 2 can be used to prevent the volume expansion with high efficiency.

For example, when the lithium secondary battery 30 of Embodiment 2 is mounted on a vehicle, it is necessary to stack a plurality of lithium secondary batteries 30 and hold the stack on both ends with a holding mechanism (not shown). The holding mechanism is used for preventing the volume expansion of the stacked lithium secondary batteries 30. The structure of the holding mechanism can be simplified by preventing the volume expansion of the lithium secondary batteries 30 according to Embodiment 2.

Since the bumpy surface 33a is formed on the solid electrolyte layer 33 harder than the collector 34 in Embodiment 2, crushing of the bumpy surface 33a can be prevented even when a positive electrode element (the collector 31 and the positive electrode layer 32) and a negative electrode element (the collector 34) are placed on both sides of the solid electrolyte layer 33 and then they are pressed. Thus, crushing of the bumpy surface 33a associated with the pressing in the lithium secondary battery 30 can be avoided in contrast to the conventional secondary battery including the negative electrode collector having the bumpy surface formed thereon. This ensures that lithium deposited during charge may be accommodated by the space S2.

The size of the space S2 can be set as appropriate. Specifically, the size may be set such that the space S2 can accommodate lithium deposited on the surface of the collector 34.

Figure 8:
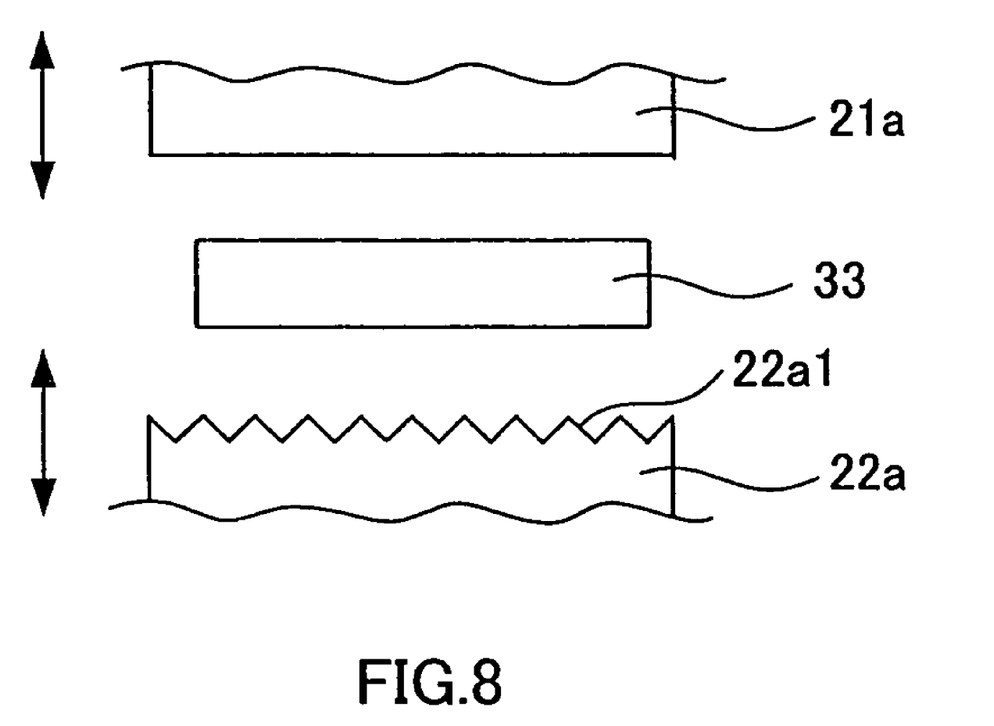
FIG. 8 A schematic diagram for explaining a process of forming the solid electrolyte layer in Embodiment 2.

Next, a method of manufacturing the lithium secondary battery 30 of Embodiment 2 will be described. The method of manufacturing the solid electrolyte layer 33 will be described particularly with reference to FIG. 8. FIG. 8 shows part of the press apparatus described in Embodiment 1 (see FIG. 4). Members identical to those described in FIG. 4 are designated with the same reference numerals. In Embodiment 2, a protrusion 22a of a press member 22 has a bumpy surface 22a1 formed on an end face.

First, a group of particles forming the solid electrolyte layer 33 is supplied into a hole 20a of a housing 20 as in Embodiment 1 (see FIGS. 4 and 5). A binder may be supplied into the hole 20a together with the group of particles to facilitate bonding between the particles. While the groups of particles having different average particle diameters are used in Embodiment 1, the group of particles having a predetermined average particle diameter is used in Embodiment 2. In other words, a plurality of groups of particles having different average particle diameters are not used.

With the group of particles supplied in the hole 20a, press members 21 and 22 are used to perform press forming of the group of particles to provide the solid electrolyte layer 33. Since the protrusion 22a has the bumpy surface 22a1 on the end face, the bumpy surface 33a is formed on the end face of the solid electrolyte layer 33 in the press forming.

Then, the positive electrode element (the collector 31 and the electrode layer 32) and the negative electrode element (the collector 34) are placed or put on both ends of the solid electrolyte layer 33. In this manner, the lithium secondary battery 30 of Embodiment 2 can be provided.

As described above, in Embodiment 2, the bumpy surface 33a can be formed integrally with the solid electrolyte layer 33 on the end surface thereof through the press forming, and the space S2 for accommodating lithium deposited on the collector 34 can be provided readily. In other words, in Embodiment 2, it is essential only that the bumpy surface 22a1 should be formed on the end face of the protrusion 22a, and the lithium secondary battery 30 of Embodiment 2 can be manufactured with the same manufacturing process as the conventional process.

As in Embodiment 1, the materials (including the active material for the positive electrode) forming the positive electrode layer 32 may be supplied into the hole 20a of the housing 20 to allow integral formation of the solid electrolyte layer 33 and the positive electrode layer 32. In this case, the collector 31 may be placed on the positive electrode layer 32 and the collector 34 may be placed on the bumpy surface 33a of the solid electrolyte layer 33 to provide the lithium secondary battery 30 of Embodiment 2.

While the bumpy surface 33a is formed integrally with the solid electrolyte layer 33 during the press forming thereof in Embodiment 2, the present invention is not limited thereto. For example, a solid electrolyte layer having substantially flat surfaces on both ends may be formed and then the bumpy surface 33a may be formed through press forming on one of the end faces of the solid electrolyte layer.

While the group of particles having the predetermined average particle diameter is used in the solid electrolyte layer 33 of Embodiment 2, groups of particles having different average particle diameters may be used as in the solid electrolyte layer 13 described in Embodiment 1. Specifically, the solid electrolyte layer 33 may be formed of a first layer (corresponding to the first layer 13a of Embodiment 1) and a second layer having the bumpy surface 33a (corresponding to the second layer 13b of Embodiment 1) such that the second layer contains a group of particles having an average particle diameter larger than that of a group of particles contained in the first layer.

With this configuration, both the space S2 provided by the bumpy surface 33a and the space between the particles in the second layer (corresponding to the space S1 in Embodiment 1) can accommodate lithium deposited on the collector 34.

The lithium secondary batteries described in Embodiments 1 and 2 can be mounted on a vehicle, for example. When the lithium secondary batteries are mounted on a vehicle, lithium secondary batteries described in each of Embodiments 1 and 2 may be stacked to provide a battery module for use on the vehicle.

The invention claimed is:

1. A lithium secondary battery comprising:
a positive electrode element having a positive electrode collector and a positive electrode layer that is formed on the positive electrode collector and includes active material; and
a negative electrode collector; and
a solid electrolyte layer placed between the positive electrode element and the negative electrode collector,
wherein the solid electrolyte layer has a first layer including a first group of particles and a second layer which includes a second group of particles having an average particle diameter larger than an average particle diameter of the first group of particles, the second layer being closer to the negative electrode collector than the first layer and being in contact with the negative electrode collector.

2. The lithium secondary battery according to claim 1, wherein the negative electrode collector includes lithium or an alloy of lithium.

* * * * *